United States Patent

[11] 3,597,847

| [72] | Inventor | Clarence W. Anderson<br>Cheraw, S.C. |
|---|---|---|
| [21] | Appl. No. | 851,342 |
| [22] | Filed | Aug. 19, 1969 |
| [45] | Patented | Aug. 10, 1971 |
| [73] | Assignee | Sonoco Products Company<br>Hartsville, S.C. |

[54] APPARATUS AND METHOD FOR MEASURING A COMPONENT OF TRAVEL OF A AXIALLY ADVANCING AND ROTATING TUBE
16 Claims, 7 Drawing Figs.

| [52] | U.S. Cl. | 33/142, 156/378 |
|---|---|---|
| [51] | Int. Cl. | G01b 3/12, G01b 5/04 |
| [50] | Field of Search | 33/141 R—141—142, 125 M, 147 L; 156/378, 351 |

[56] References Cited

UNITED STATES PATENTS

| 516,686 | 3/1894 | Meyer | 33/141 |
|---|---|---|---|
| 679,569 | 7/1901 | McCartney | 74/198 |
| 967,297 | 8/1910 | Allen | 235/91 |
| 2,087,335 | 7/1937 | Seeley | 33/134 |
| 2,209,584 | 7/1940 | Somerville | 33/125 |
| 2,747,649 | 5/1956 | Reed | 156/1.75 |
| 2,806,291 | 9/1957 | Robertson | 33/141 |
| 3,304,434 | 2/1967 | Koster | 250/231 |

FOREIGN PATENTS

| 115,871 | 1/1930 | Austria. | |

*Primary Examiner*—Robert B. Hull
*Attorney*—Parrott, Bell, Seltzer, Park & Gibson ABSTRACT: A surface contacting device is applied to a rotating and axially advancing tube to measure the angular direction of travel of the surface and the length of travel of a point on the surface in its generally helical path or its axial or its rotary component, or all of them. A freely pivotable arm extending over the tube carries an endless belt which engages the moving surface and is swiveled thereby into the direction of the surface travel. A sphere and disc type of resolver at one of the belt pulleys provides for picking off the selected component or the resultant travel, and a pulse generator driven thereby transmits to a counter where the length of travel is indicated.

Patented Aug. 10, 1971

INVENTOR:
CLARENCE W. ANDERSON

BY Parrott, Bell, Seltzer, Park & Gibson
ATTORNEYS

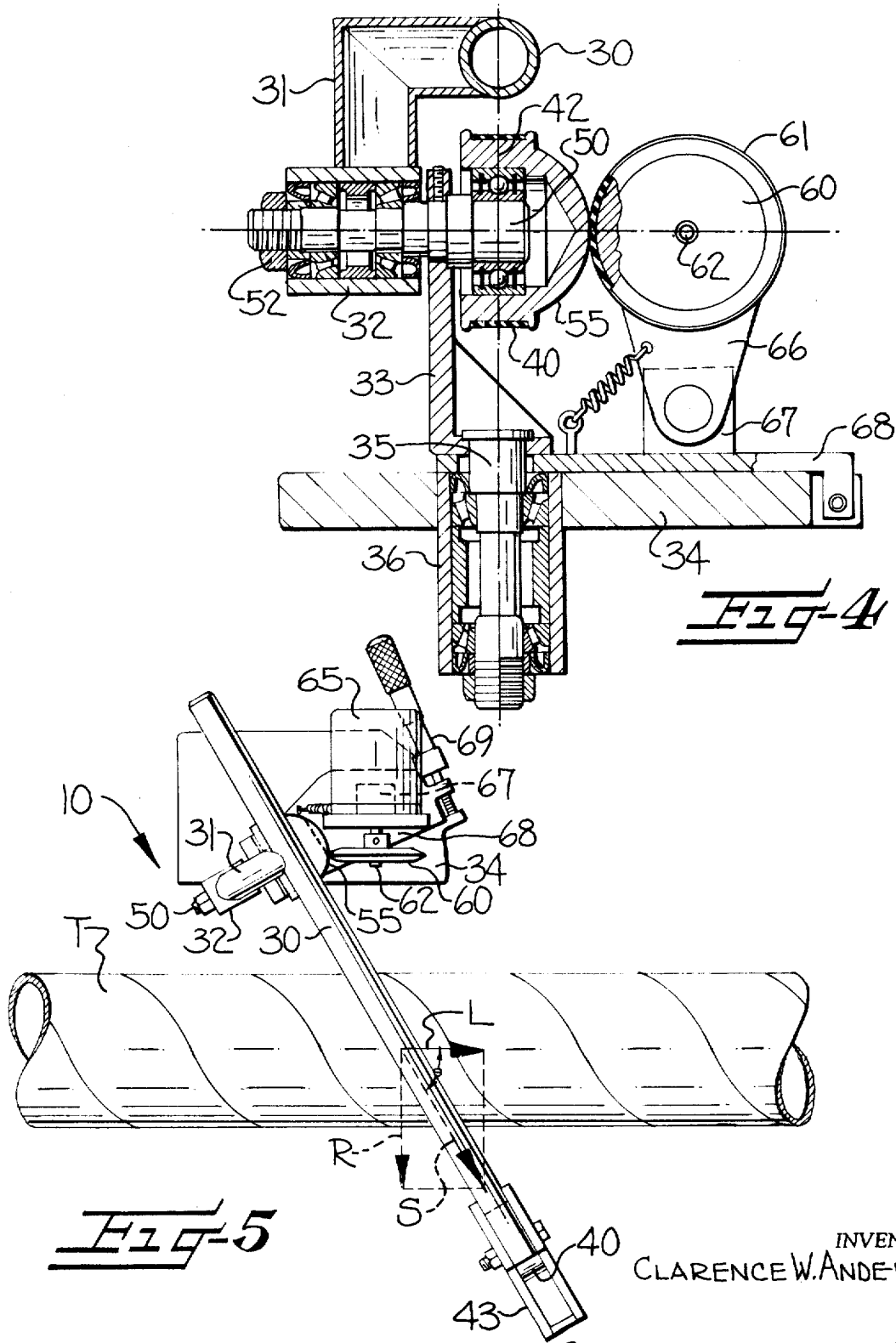

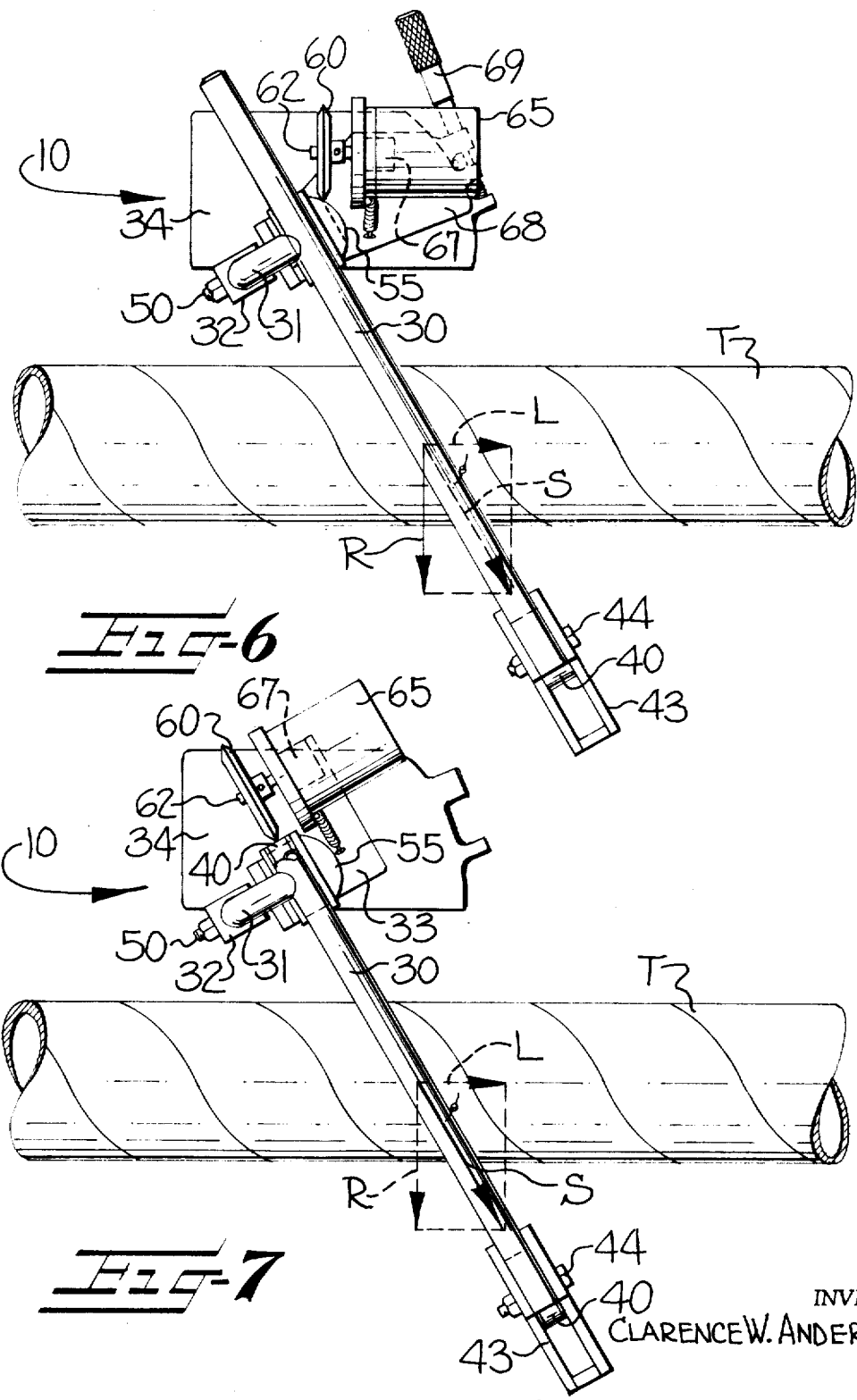

APPARATUS AND METHOD FOR MEASURING A COMPONENT OF TRAVEL OF A AXIALLY ADVANCING AND ROTATING TUBE

This invention relates to apparatus and method for measuring a component of travel of an axially advancing and rotating tube.

Heretofore, in various manufacturing operations including spirally wound paper tubes, in which the tube is formed is traveling forward in an axial, longitudinal direction while rotating such that a point on the surface of the advancing tube is traveling helically, a problem of measuring the axial, rotary and surface components of travel has long been presented. Measurements of these components of travel in such manufacturing operations are necessary for a variety of reasons including determining the length of the product produced and when portions of the formed product are to be cut off for the formation of other products, applying paints, dyes or glues in various manners thereto, determining the amount of material used in the formation of the product, etc. Also, the necessity for obtaining these measurements for any generally cylindrical body including tubes which is traveling both longitudinally and rotationally would present the same problems and the term "tube" as used broadly herein is intended to cover any cylindrical body in which measurements of the type contemplated herein are needed.

Various attempts have been made at satisfactorily obtaining measurements of these types for an axially moving and rotating tube or cylindrical body, but none of these prior attempts have proven satisfactory. In the manufacture of spirally wound paper tubes, for example, it has heretofore been the practice to utilize a pivotally mounted wand which would be engaged by the end of the longitudinally advancing paper tube and would be pivoted until the desired length of tube has been formed at which time the pivoting wand would actuate a cutting mechanism for cutting off a desired length of the paper tube. However, this pivoting wand proved to be a very inaccurate means of measuring the longitudinal growth or axial component of travel of the axially advancing and rotating tube as it is being manufactured.

Accordingly, it is the primary object of this invention to provide apparatus and methods for automatically and accurately measuring the axial, rotary and surface components of an axially advancing and rotating tube.

It has been found by this invention that the above object may be accomplished by providing an apparatus comprising a first means adapted to contact the surface of the advancing tube for measuring the length of surface travel of the advancing tube, second means responsive to the axial speed and rotational speed of the advancing tube for measuring the angle of surface travel of the advancing tube with respect to its longitudinal axis, and third means operatively connected with and responsive to the first and second means for mechanically computing and indicating one of the axial, rotary and surface components of travel of the advancing tube.

The method of this invention which may be performed on the above apparatus includes the steps of mechanically measuring the length of surface travel of the advancing tube, mechanically measuring the angle of surface travel of the advancing tube with respect to its longitudinal axis, and mechanically computing one of the axial, rotary and surface components of travel of the advancing tube from the mechanical measurements of length of surface travel and angle of surface travel of the advancing tube.

Some of the objects of this invention having been set forth, other objects will appear as the description proceeds, when taken in conjunction with the accompanying drawings, in which:

FIG. 4 is a vertical cross-sectional view, taken generally along the line 4-4 of FIG. 3;

FIG. 5 is an enlarged top plan view of the form of measuring apparatus of this invention illustrated in FIG. 2 and utilized to measure the axial component of travel;

FIG. 6 is an enlarged top plan view of another form of the measuring apparatus of this invention and utilized to measure the rotary component of travel; and FIG. 7 is an enlarged top plan view of still another of the measuring apparatus of this invention and utilized to measure the surface component of travel.

Figure 1:
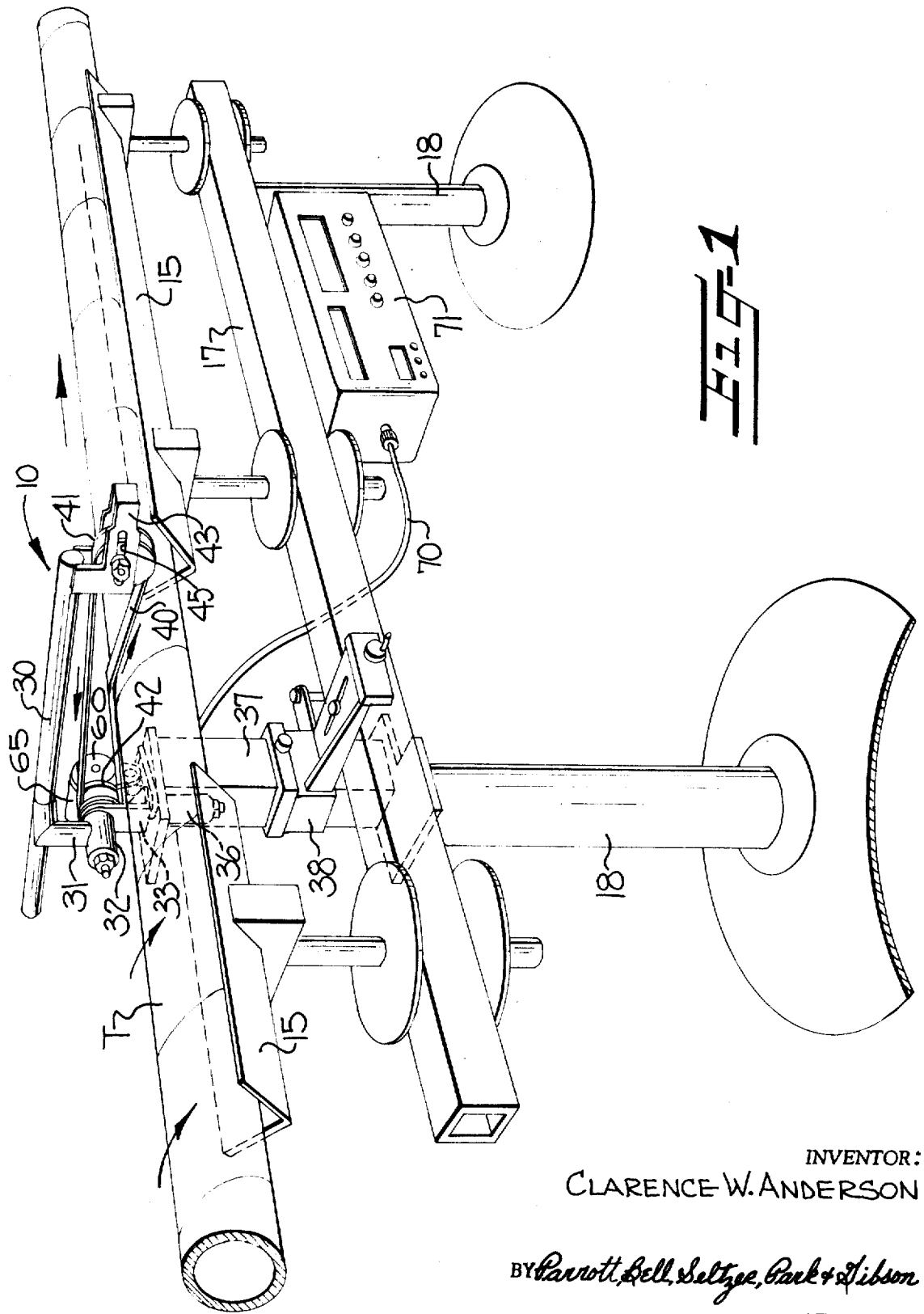
FIG. 1 is a perspective view of a mechanism utilizing one form of the measuring apparatus of the present invention.

Referring now to the drawings, the apparatus for measuring the components of travel of an advancing and rotating tube $T$ is generally indicated therein by the reference numeral 10. FIGS. 1—5 illustrate the form and arrangement of the measuring apparatus for measuring the axial component of travel of the linearly advancing and rotating tube $T$. FIG. 6 illustrates another form or arrangement of the measuring apparatus 10 which is utilized for measuring the rotary component of travel of the tube $T$ and FIG. 7 illustrates still another form of measuring apparatus 10 utilized for measuring the surface component of travel of the tube $T$. The arrangements or forms of the measuring apparatus illustrated in FIGS. 6 and 7 comprise basically the same component parts as does the form of the apparatus illustrated in FIGS. 1—5 and, therefore, like reference numerals will be utilized in FIGS. 6 and 7 to illustrate the same component parts illustrated in FIGS. 1—5. It is only the position of these elements or component parts which are changed in the form of the measuring apparatus illustrated in FIGS. 6 and 7, as will be described in more detail below.

Figure 2:
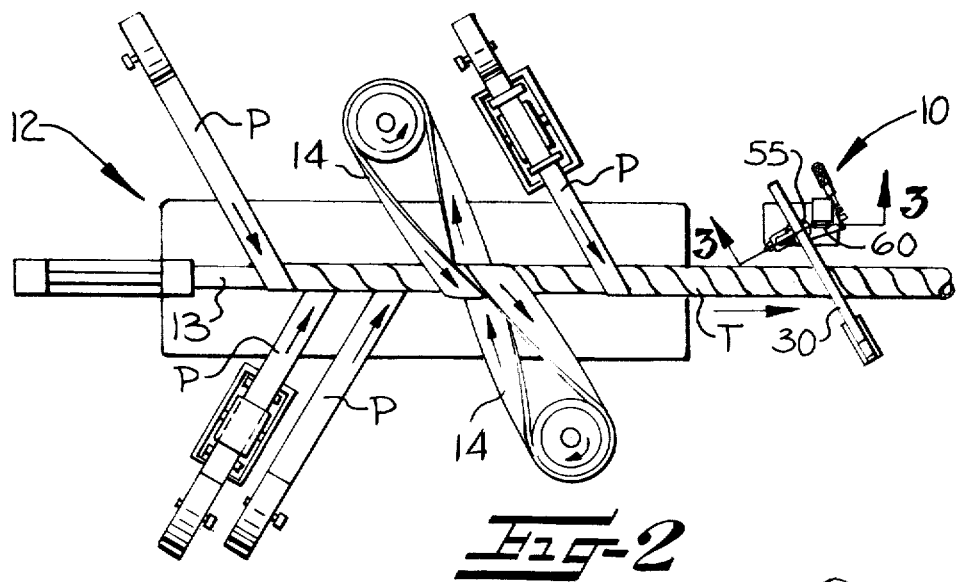
FIG. 2 is a schematic top plan view of a spiral tube-forming machine utilizing one form of the measuring apparatus of the present invention.
Figure 3:
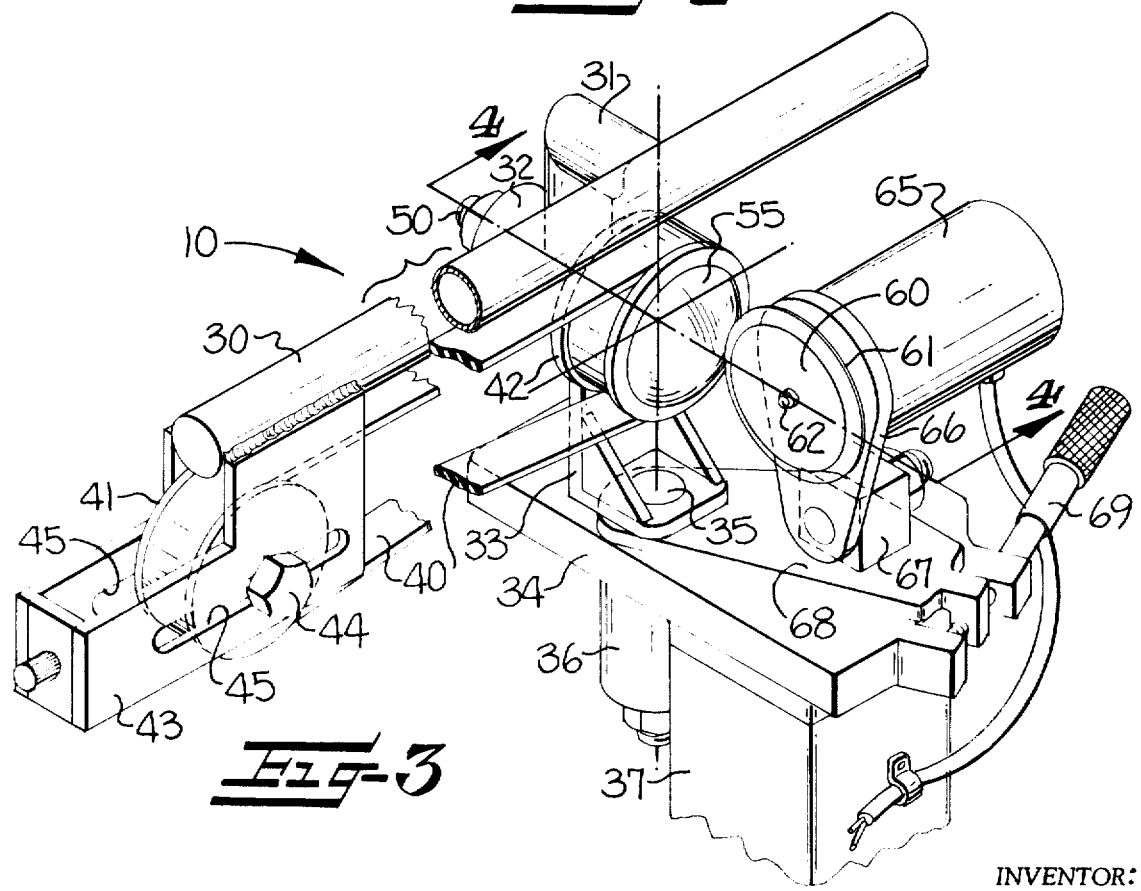
FIG. 3 is an enlarged perspective view, broken away, of one form of the measuring apparatus of this invention and taken generally along and in the manner indicated by the line 3-3 of FIG. 2.

As shown in FIGS. 1 and 2, this measuring apparatus 10 may be utilized or positioned at one end of a conventional spirally wound tube-forming machine, generally indicated at 12, in which a plurality of layers of paper $P$ are led from rolls through an adhesive solution and onto a mandrel 13 at an angle, as shown in FIG. 2, for the formation of a spirally wound tube $T$. The use of belts 14 for rotating the tube $T$ as it is being formed on the mandrel 13 is well understood by all of those with ordinary skill in the tubemaking art and further explanation of this basic machine is not deemed necessary herein.

As the tube is axially advanced after formation from one end of the mandrel 13, it may be supported in a horizontal position in trough-shaped support members, such as shown at 15 in FIG. 1. These trough-shaped support members 15 may be suitably supported by any frame arrangement, such as horizontally extending bar 17 secured to and carried by leg members 18 extending from the floor or other support surface. Extending beyond the other end of trough 15 or a series of such tube-receiving troughs, there may be other fabricating apparatus, such as a tube cutoff device, painting apparatus, gluing apparatus, etc. In order to determine the desired components of travel, i.e., axial, rotary and surface, the measuring apparatus 10 may be utilized between the spirally wound tube-forming machine 12 and the subsequent fabricating apparatus or otherwise as desired. This tube-measuring apparatus 10 will compute the desired axial, rotary and surface components of tube movement while the tube is moving both axially in a longitudinal direction and rotationally due to the action of belts 14 in the formation of the tube $T$ on the mandrel 13.

The measuring apparatus 10 comprises an arm 30 pivotally mounted on a portion of the above-described frame, such as by an L-shaped connecting rod member 31 extending from one side of the arm 30 and being secured to a hollow cylindrical member 32 which is in turn pivotally mounted on shaft 50 which is secured to an L-shaped bracket 33. The L-shaped bracket 33 is pivotally mounted on a plate 34 by a pivot bolt 35 and cylindrical housing 36 through which the bolt 35 passes and has suitable bearings therein to allow free pivotal rotation of the L-shaped bracket 33 and thus the arm 30. The plate 34 is suitably carried on top of column member 37 which is secured by any suitable bracket means 38 to the frame bar 17.

Mounted on the arm 30 and extending parallel therewith is an endless belt 40 which is secured around a first pulley 41 at the forward end of the arm 30 and a second pulley 42 at the rear end of the arm 30. The pulley 41 is rotatably carried in a housing 43 secured to and extending from the arm 30 so as to position the pulley 41 directly below the arm 30. The pulley 41 is rotatably mounted in the housing 43 by a bolt 44 extending through slots 5 on each side of the housing 43, in the manner shown particularly in FIG. 3. The pulley 42 is rotatably carried on the shaft 50 by a suitable bearing means, as shown in FIG. 4. The shaft 50 is secured within a hole through L-shaped bracket 33 and extends on through the tubular support member 32 which is secured in place by a nut 52 at the other end of the shaft 50. Thus, the endless belt 40 extends parallel with and directly below the arm 30 and is freely rotatable on pulleys 41 and 42.

The measuring apparatus 10 further comprises a spherical driving surface 55 extending from the pulley 42 generally perpendicularly outwardly from the arm 30 so that the spherical surface will be positioned in direct relation to the position of the arm 30 according to the pivotal position assumed by the arm 30.

The above-described apparatus is common to all three forms of the invention. Referring now to FIGS. 1—5 for the form or arrangement of the invention for measuring the axial component of travel of the tube $T$, there is mounted for contact with the spherical surface 55 a rotatable wheel 60 having a rubber tire 61 or other suitable surface on the outer periphery thereof. The wheel 60 is mounted in a plane generally parallel to the axial component of travel of the tube $T$. The outer periphery 61 of the driven wheel 60 is adapted to engage a circular track or portion of the spherical surface 55, as indicated in dotted lines in FIG. 5, according to the pivotal position of the spherical surface 55. For example, if the arm 30 and spherical surface 55 are pivoted further to the right, as viewed in FIG. 5, the outer periphery 61 of the wheel 60 will engage and be driven by a larger circular track around the spherical surface 55 than if the arm 30 and spherical surface 55 were pivoted further to the left, as viewed in FIG. 5.

The wheel 60 is rotatably carried on a shaft 62 extending from an electrical pulse generator 65. The electrical pulse generator 65 is supported from the plate 34 by a collar 66 extending therearound and pivotally mounted on a block 67 secured to a plate 68 which also passes around pivot shaft 35 at one end thereof and is attached to an adjustable micrometer means 69 at the other end thereof. The micrometer means, as shown in FIG. 4, is adapted to adjust the plate 68 and thus the driven wheel 60 for fine adjustments relative to the spherical surface 55.

Thus, as the wheel 60 is driven by the spherical surface 55, it will rotate shaft 62 from the electrical pulse generator 65 to generate a series of electrical pulses, the number of which corresponds to the revolutions of the wheel 60. The pulse generator 65 is connected by a suitable electrical line 70 to a readout means or control box 71, as shown in FIG. 1. The control box or readout box 71 may be suitably programmed to translate the electrical pulses into feet and inches or otherwise, as desired, for a readout of the measurement taken by the apparatus 10. Also, the control box 71 may be suitably connected with suitable fabricating apparatus for automatically actuating the same at predetermined measurements. The details of the construction of the readout or control box 71 do not form part of this invention and further details thereof are not deemed necessary herein.

In the operation of the measuring apparatus 10, described above, the arm 30 will normally be positioned generally at an angle across the axially advancing and rotating tube $T$ such that the endless belt 40 will be in frictional contact with the outside surface of the tube $T$. Inasmuch as the endless belt 40 is freely rotatable on pulleys 41 and 42, the frictional engagement between the moving tube $T$ and the belt 40 will cause the belt 40 to rotate a distance equal to the surface travel of the tube $T$. Also, inasmuch as the arm 30 carrying the belt 40 is freely pivotal about the shaft 35, the arm 30 and belt 40 under the influence of the axial speed and rotational speed of the advancing tube $T$ will align itself with the direction of surface travel which is generally in the form of a helix and therefore is at an angle with respect to the longitudinal axis of the tube $T$. Thus, the endless belt 40 is a means for measuring the length of surface travel of the advancing tube and the pivotally movable arm 30 is a means for measuring the angle of surface travel of the advancing tube $T$ with respect to its longitudinal axis.

Referring now to the vector diagram superimposed on the top plan view of the form of measuring apparatus illustrated in FIG. 5 for measuring the axial component of travel, it may be seen that the surface component of travel of the tube is indicated by the vector $S$, the axial component of travel of the tube is designated by the vector $L$ and the rotary component of travel of the tube is designated by the vector $R$. Inasmuch as the apparatus 10 measures the surface travel of the tube or the vector $S$ and measures the angle indicated at $\theta$ between the direction of surface travel and the longitudinal axis of the tube or axial travel vector $L$, the formula for obtaining the axial component of tube travel or vector $L$ would be as follows:

cosine of an angle of a triangle = (adjacent side)/hypotenuse $$\text{cosine } \theta = L/S$$

$$L = S \text{ cosine } \theta$$

Accordingly, from the measurements obtained by the arm 30 and the endless belt 40, the axial component of travel of the tube $T$ may be determined from a fixed ratio expressed by (axial travel) = (length of surface travel) × (cosine of the angle of surface travel with respect to the longitudinal).

In this invention, this ratio is obtained from the spherical surface 55 driving the wheel 60 in varying fixed ratios according to the pivotal position of the arm 30 and the speed of movement of the belt 40. In like manner, rotation of the wheel 60 will generate a number of electrical pulses which can also be related to an axial measurement in inches of the advance of the tube $T$. For example, one revolution of the wheel 60 could generate 1,000 pulses when the wheel 60 is a 10-inch circumference wheel and 100 pulses could be related to 1 inch of axial movement of the tube $T$.

It may be easily seen how the spherical surface 55 will drive the wheel 60 in direct relation to the above-described formula by referring to FIG. 5 wherein it may be visualized that if the tube $T$ were only rotating and not moving in an axial direction at all, then the vector $S$ would be superimposed on the vector $R$ and there would be no vector $L$. When this happens, the arm 30 would be at a right angle to the tube $T$ and the wheel 60 would be engaging the spherical surface 55 at the innermost center portion thereof and, accordingly, would have only point contact therewith and would not be driven thereby. Conversely, if the tube was only moving axially forwardly and was not rotating, the vector $S$ would be superimposed on the vector $L$ and the arm 30 would be parallel with the tube $T$. This would place the wheel 60 at the outermost point on the spherical surface 55 such that it would transcribe a circle around the spherical surface at the widest position thereon and have a direct-driving relationship therefrom. Accordingly, the spherical surface 55 and the drive wheel 60 compute the vector $L$ from the angle $\theta$ and the vector $S$.

Referring now to the form of the invention illustrated in FIG. 6 for measuring the rotary component of travel of the tube $T$, it may be seen therein that the only difference in the arrangement or form of the apparatus 10 for obtaining this measurement is the mounting of the wheel 60 in such a position that it is parallel to the rotary vector $R$ and the direction of the rotary component of travel of the tube $T$.

As discussed above, inasmuch as the apparatus 10 measures the surface travel of the tube or vector $S$ and measures the angle indicated at $\theta$ between the direction of surface travel and longitudinal axis of the tube or axial travel vector $L$, the formula for obtaining the rotary component of tube travel or vector $R$ would be as follows:

sine of an angle of a triangle = (opposite side)/hypotenuse $$\text{sine } \theta = R/S$$

$$R = S \text{ sine } \theta$$

Accordingly, from the measurements obtained by the arm 30 and the endless belt 40, the rotary component of travel of the tube $T$ may be determined from a fixed ratio expressed by (rotary travel) = (length of surface travel) × (sine of the angle of surface travel with respect to the longitudinal). In the form or arrangement of this invention illustrated in FIG. 6, the driven wheel 60 by being mounted in a plane parallel to the direction of rotary travel or the rotary vector $R$ will be driven by the spherical surface 55 in varying fixed ratios according to the above expressed ratio by the pivotal position of the arm 30 and the speed of movement of the belt 40.

Referring now to the form of the invention illustrated in FIG. 7 for measuring the surface component of travel of the tube $T$, it may be seen therein that the difference in the arrangement or form of the apparatus 10 for obtaining this measurement is the mounting of the wheel 60 in such a position that it is parallel to the surface travel vector $S$ and the direction of the surface component of travel of the tube $T$. Also, the wheel 60 is pivotally carried by an extension of the bracket 33 so that it and the electrical pulse generator 65 will freely pivot with the arm 30. This positioning and mounting of the wheel 60 is for the purpose of allowing the wheel 60 to contact and be directly driven by the endless belt 40.

As discussed above, the apparatus 10 measures the surface travel of the tube or vector $S$ by the arm 30 assuming a position in line with the surface travel of the tube $T$ and the endless belt 40 engaging the surface of the tube $T$ to be driven thereby an amount directly equal to the surface travel of the tube $T$. Accordingly, the surface component of travel of the tube $T$ may be expressed by the fixed ratio of (surface component of travel) = (length of surface travel). In the form or arrangement of the invention illustrated in FIG. 7, the driven wheel 60 is mounted in a plane parallel to the surface travel or the surface vector $S$ and is driven directly by the endless belt 40 in a fixed ratio as expressed above. It is evident that the spherical surface 55 is not needed in this form or arrangement of measuring apparatus and could be eliminated from the apparatus of FIG. 7.

From the above description, it may be seen that apparatus has been provided for measuring the axial, rotary and surface components of travel of an axially advancing and rotating tube or cylindrical body. While separate forms or arrangement of apparatus have been illustrated for obtaining each of these measurements, it is entirely possible and within the scope of this invention that a single apparatus could be provided for simultaneously obtaining all of these measurements. This apparatus could utilized a ball-shaped driving surface in lieu of the spherical surface 55 wherein driving wheels 60 could be mounted parallel to the various components of travel for obtaining all three reading simultaneously.

In the drawings and specification, there has set forth a preferred embodiment of this invention and, although specific terms are employed, they are used in a generic and descriptive sense only and not for purposes of limitation.

What I claim is:

1. Apparatus for measuring a component of travel of an axially advancing and rotating tube comprising first means adapted to contact the surface of the advancing tube for measuring the length of surface travel of the advancing tube, second means responsive to the axial speed and rotational speed of the advancing tube for measuring the angle of surface travel of the advancing tube with respect to its longitudinal axis, and third means operatively connected with and responsive to said first and second means for mechanically computing and indicating one of the axial rotary and surface components of travel of the moving tube.

2. Apparatus, as set forth in claim 1, wherein said second means is connected to and controlled by said first means through the contact of said first means with the surface of the advancing tube.

3. Apparatus, as set forth in claim 2, wherein said second means comprises a pivotally mounted arm adapted to extend across the advancing tube at an angle with respect to its longitudinal axis, and wherein said first means comprises an endless belt rotatably mounted on and extending parallel with said arm to frictionally contact the surface of the advancing tube for aligning itself and said arm with the direction of surface travel of the advancing tube and for rotating through the frictional contact an amount equal to the length of surface travel of the tube.

4. Apparatus for measuring the axial component of travel of an axially advancing and rotating tube comprising first means adapted to contact the surface of the advancing tube for measuring the length of surface travel of the advancing tube, second means responsive to the axial speed and rotational speed of the advancing tube for measuring the angle of surface travel of the advancing tube with respect to its longitudinal axis, and third means operatively connected with and responsive to said first and second means for mechanically computing and indicating the axial travel component of the moving tube.

5. Apparatus for measuring the axial component of travel of an axially advancing and rotating tube comprising first means adapted to contact the surface of the advancing tube for measuring the length of surface travel of the advancing tube, said first means comprising an endless belt rotatably mounted and adapted to extend across the advancing tube at an angle with respect to its longitudinal axis for frictionally contacting the surface of the advancing tube and for being rotated thereby an amount equal to the length of surface travel of the tube, second means responsive to the axial speed and rotational speed of the advancing tube and measuring the angle of surface travel of the advancing tube with respect to its longitudinal axis, said second means comprising a pivotally mounted arm adapted to extend across the advancing tube at an angle with respect to its longitudinal axis and rotatably carrying said endless belt in parallel relationship therewith so that said arm will align itself with the direction of surface travel of the advancing tube as said endless belt is rotated thereby, and third means operatively connected with and responsive to said first and second means for indicating and computing the axial component of travel of the advancing tube, said third means comprising a rotatable member operatively connected with said endless belt for rotation thereby an amount directly proportional to the travel of said belt and carried by said arm and having a spherical surface extending generally perpendicularly outwardly from said arm so that said spherical surface will be positioned in direct relation to the position of said arm, a rotatable wheel means mounted in a plane generally parallel to the axial component of travel of the tube in such a position that the outside periphery thereof will frictionally engage a circular portion of said rotating spherical surface, determined by the angular position of said arm, to be rotated thereby for computing the axial component of travel of the tube, and means operatively connected to and responsive to the rotation of said wheel means for indicating the amount of axial travel of the tube.

6. Apparatus, as set forth in claim 5, wherein said third means further includes an electrical impulse generator means connected with and driven by said wheel means such that each revolution of said wheel means will produce a predetermined number of electrical pulses, and an electrical pulse counter means operatively connected with said electrical pulse generator for receiving the electrical pulse therefrom and for counting the electrical pulses to indicate the axial component of travel of the tube.

7. Apparatus for measuring the rotary component of travel of an axially advancing and rotating tube comprising first means adapted to contact the surface of the advancing tube for measuring the length of surface travel of the advancing tube, second means responsive to the axial speed and rotational speed of the advancing tube for measuring the angle of surface travel of the advancing tube with respect to its longitudinal axis, and third means operatively connected with and responsive to said first and second means for mechanically computing and indicating the rotary travel component of the moving tube.

8. Apparatus for measuring the rotary component of travel of an axially advancing and rotating tube comprising first means adapted to contact the surface of the advancing tube for measuring the length of surface travel of the advancing tube, said first means comprising an endless belt rotatably mounted and adapted to extend across the advancing tube at an angle with respect to its longitudinal axis for frictionally contacting the surface of the advancing tube and for being rotated thereby an amount equal to the length of surface travel of the tube, second means responsive to the axial speed and rotational speed of the advancing tube and measuring the angle of surface travel of the advancing tube with respect to its longitudinal axis, said second means comprising a pivotally mounted arm adapted to extend across the advancing tube at an angle with respect to its longitudinal axis and rotatably carrying said endless belt in parallel relationship therewith so that said arm will align itself with the direction of surface travel of the advancing tube as said endless belt is rotated thereby, and third means operatively connected with and responsive to said first and second means for indicating and computing the rotary component of travel of the advancing tube, said third means comprising a rotatable member operatively connected with said endless belt for rotation thereby an amount directly proportional to the travel of said belt and carried by said arm and having a spherical surface extending generally perpendicularly outwardly from said arm so that said spherical surface will be positioned in direct relation to the position of said arm, a rotatable wheel means mounted in a plane generally parallel to the rotary component of travel of the tube in such a position that the outside periphery thereof will frictionally engage a circular portion of said rotating spherical surface, determined by the angular position of said arm, to be rotated thereby for computing the rotary component of travel of the tube, and means operatively connected to and responsive to the rotation of said wheel means for indicating the amount of rotary travel of the tube.

9. Apparatus, as set forth in claim 8, wherein said third means further includes an electrical impulse generator means connected with and driven by said wheel means such that each revolution of said wheel means will produce a predetermined number of electrical pulses, and an electrical pulse counter means operatively connected with said electrical pulse generator for receiving the electrical pulse therefrom and for counting the electrical pulses to indicate the rotary component of travel of the tube.

10. Apparatus for measuring the surface component of travel of an axially advancing and rotating tube comprising first means adapted to contact the surface of the advancing tube for measuring the length of surface travel of the advancing tube, second means responsive to the axial speed and rotational speed of the advancing tube for measuring the angle of surface travel of the advancing tube with respect to its longitudinal axis, and third means operatively connected with and responsive to said first and second means for mechanically computing and indicating the surface travel component of the moving tube.

11. Apparatus for measuring the surface component of travel of an axially advancing and rotating tube comprising first means adapted to contact the surface of the advancing tube for measuring the length of surface travel of the advancing tube, said first means comprising an endless belt rotatably mounted and adapted to extend across the advancing tube at an angle with respect to its longitudinal axis for frictionally contacting the surface of the advancing tube and for being rotated thereby an amount equal to the length of surface travel of the tube, second means responsive to the axial speed and rotational speed of the advancing tube and measuring the angle of surface travel of the advancing tube with respect to its longitudinal axis, said second means comprising a pivotally mounted arm adapted to extend across the advancing tube at an angle with respect to its longitudinal axis and rotatably carrying said endless belt in parallel relationship therewith so that said arm will align itself with the direction of surface travel of the advancing tube as said endless belt is rotated thereby, and third means operatively connected with and responsive to said first and second means for indicating and computing the surface component of travel of the advancing tube, said third means comprising a rotatable wheel means mounted in a plane generally parallel to the surface component of travel of the tube and carried by said pivoting arm in such a manner that the outside periphery thereof will frictionally engage said rotating endless belt in any angular position of said arm to be rotated by said belt for computing the surface component of travel of the tube, and means operatively connected to and responsive to the rotation of said wheel means for indicating the amount of surface travel of the tube.

12. Apparatus, as set forth in claim 11, wherein said third means further includes an electrical impulse generator means connected with and driven by said wheel means such that each revolution of said wheel means will produce a predetermined number of electrical pulses, and an electrical pulse counter means operatively connected with said electrical pulse generator for receiving the electrical pulse therefrom and for counting the electrical pulses to indicate the surface component of travel of the tube.

13. Method for measuring a component of travel of an axially advancing and rotating tube comprising the steps of mechanically measuring the length of surface travel of the advancing tube, mechanically measuring the angle of surface travel of the advancing tube with respect to its longitudinal axis, and mechanically computing one of the axial, rotary and surface components of travel of the advancing tube from the mechanical measurements of length of surface travel and angle of surface travel of the advancing tube.

14. Method for measuring the axial component of travel of an axially advancing and rotating tube comprising the steps of mechanically measuring the length of surface travel of the advancing tube, mechanically measuring the angle of surface travel of the advancing tube with respect to its longitudinal axis, and mechanically computing the axial component of travel of the advancing tube from the mechanical measurements of length of surface travel and angle of surface travel of the advancing tube.

15. Method for measuring the rotary component of travel of an axially advancing and rotating tube comprising the steps of mechanically measuring the length of surface travel of the advancing tube, mechanically measuring the angle of surface travel of the advancing tube with respect to its longitudinal axis, and mechanically computing the rotary component of travel of the advancing tube from the mechanical measurements of length of surface travel and angle of surface travel of the advancing tube.

16. Method for measuring the surface component of travel of an axially advancing and rotating tube comprising the steps of mechanically measuring the length of surface travel of the advancing tube, mechanically measuring the angle of surface travel of the advancing tube with respect to its longitudinal axis, and mechanically computing the surface component of travel of the advancing tube from the mechanical measurements of length of surface travel and angle of surface travel of the advancing tube.